United States Patent
Jauch et al.

(10) Patent No.: US 11,441,679 B2
(45) Date of Patent: Sep. 13, 2022

(54) TRANSMISSION FOR A MOTORCYCLE, AND MOTORCYCLE COMPRISING SUCH A TRANSMISSION

(71) Applicant: Bayerische Motoren Werke Aktiengesellschaft, Munich (DE)

(72) Inventors: Thilo Jauch, Munich (DE); Josef Seidl, Strasskirchen (DE); Ola Stenegard, Freising (DE); Roland Stocker, Salzweg (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 150 days.

(21) Appl. No.: 16/963,425

(22) PCT Filed: Jan. 29, 2019

(86) PCT No.: PCT/EP2019/052154
§ 371 (c)(1),
(2) Date: Jul. 20, 2020

(87) PCT Pub. No.: WO2019/158356
PCT Pub. Date: Aug. 22, 2019

(65) Prior Publication Data
US 2021/0088136 A1   Mar. 25, 2021

(30) Foreign Application Priority Data

Feb. 13, 2018   (DE) .................. 10 2018 202 219.4

(51) Int. Cl.
*F16H 63/34* (2006.01)
*B62H 5/08* (2006.01)
(Continued)

(52) U.S. Cl.
CPC .......... *F16H 63/3441* (2013.01); *B62H 5/08* (2013.01); *B62M 7/04* (2013.01); *B62M 11/06* (2013.01); *B60R 2325/306* (2013.01)

(58) Field of Classification Search
CPC ..... B60R 25/06; B60R 25/063; B60R 25/066; B60R 2325/306; F16H 63/3441;
(Continued)

(56) References Cited

U.S. PATENT DOCUMENTS

| | | | |
|---|---|---|---|
| 4,329,953 A | 5/1982 | Row | |
| 6,095,310 A * | 8/2000 | Voda | F16H 63/34 192/39 |

(Continued)

FOREIGN PATENT DOCUMENTS

| | | |
|---|---|---|
| CN | 1223214 A | 7/1999 |
| CN | 1699108 A | 11/2005 |

(Continued)

OTHER PUBLICATIONS

Schmidt, Frank, Espacenet machine translation of CN102869562. 2015. Espacenet. (Year: 2015).*

(Continued)

*Primary Examiner* — Ernesto A Suarez
*Assistant Examiner* — Lori Wu
(74) *Attorney, Agent, or Firm* — Crowell & Moring LLP (57) ABSTRACT

A transmission for a motorcycle includes a housing, at least one shaft at least partially accommodated in the housing and which can be rotated relative to the housing, and a locking device having at least one locking element located in the housing. The at least one locking element is movable moved relative to the housing between at least one locking position in which the at least one locking element secures the shaft against rotation relative to the housing, and at least one (Continued)

release position in which the at least one locking element releases the shaft for rotation relative to the housing.

10 Claims, 1 Drawing Sheet

(51) Int. Cl.
  *B62M 7/04* (2006.01)
  *B62M 11/06* (2006.01)
(58) Field of Classification Search
  CPC ........ F16H 63/3491; B62H 5/08; B62M 7/04; B62M 11/06
  See application file for complete search history.

(56) References Cited

U.S. PATENT DOCUMENTS

| | | |
|---|---|---|
| 2004/0237694 A1 | 12/2004 | Lindenschmidt et al. |
| 2015/0252897 A1 | 9/2015 | Kristofcsak |

FOREIGN PATENT DOCUMENTS

| | | |
|---|---|---|
| CN | 1860052 A | 11/2006 |
| CN | 201095405 Y | 8/2008 |
| CN | 201111482 Y | 9/2008 |
| CN | 201261506 Y | 6/2009 |
| CN | 102869562 A | 1/2013 |
| CN | 104334936 A | 2/2015 |
| CN | 105508598 A | 4/2016 |
| CN | 205524608 U | 8/2016 |
| CN | 106892026 A | 6/2017 |
| CN | 206358260 U | 7/2017 |
| DE | 42 35 142 A1 | 11/1993 |
| DE | 10 2009 033 475 A1 | 1/2011 |
| DE | 10 2015 115 195 A1 | 6/2016 |
| EP | 1 547 912 A1 | 6/2005 |
| EP | 1 669 264 A1 | 6/2006 |
| EP | 2 916 045 A1 | 9/2015 |
| JP | 2002-166742 A | 6/2002 |
| JP | 3147189 U | 12/2008 |
| KR | 10-2007-0063158 | 6/2007 |

OTHER PUBLICATIONS

International Search Report (PCT/ISA/210) issued in PCT Application No. PCT/EP2019/052154 dated May 7, 2019 with English translation (six pages).

German-language Written Opinion (PCT/ISA/237) issued in PCT Application No. PCT/EP2019/052154 dated May 7, 2019 (nine pages).

German-language Search Report issued in German Application No. 10 2018 202 219.4 dated Feb. 13, 2019 with partial English translation (13 pages).

Chinese-language Office Action issued in Chinese Application No. 201980007451.9 dated Mar. 1, 2021 with English translation (20 pages).

\* cited by examiner

TRANSMISSION FOR A MOTORCYCLE, AND MOTORCYCLE COMPRISING SUCH A TRANSMISSION

BACKGROUND AND SUMMARY OF THE INVENTION

The invention relates to a transmission for a motorcycle and to a motorcycle with a transmission of this type.

A transmission of this type for a motorcycle and a motorcycle with a transmission of this type are already known, for example, from CN 1699108 A. The transmission has a housing and at least one shaft which can be rotated relative to the housing and is received at least partially in the housing. The shaft is, for example, a transmission output shaft. In its completely manufactured state, the motorcycle comprises, for example, the transmission and a drive motor which is configured, for example, as an internal combustion engine and by which at least one wheel of the motorcycle and therefore the motorcycle overall can be driven via the transmission.

Furthermore, the transmission comprises a locking device which has at least one locking element which is arranged in the housing. The locking element can be moved relative to the housing between at least one locked position and at least one released position. In the locked position, the locking element secures the shaft against a rotation relative to the housing, with the result that the shaft cannot rotate relative to the housing. In the released position, the locking element releases the shaft for a rotation relative to the housing, with the result that the shaft can rotate relative to the housing. The shaft is coupled, for example, at least indirectly to the abovementioned, at least one wheel of the motorcycle, with the result that, when the shaft is secured by means of the locking element against a rotation relative to the housing, the wheel is secured against a rotation. The at least one wheel cannot then rotate, with the result that the motorcycle cannot be rolled simply along a roadway, for example, and therefore cannot be stolen simply.

Furthermore, DE 42 35 142 A1 discloses a motorbike transmission lock with the object of achieving satisfactory securing against theft.

It is an object of the present invention to develop a transmission and a motorcycle of the type mentioned at the outset in such a way that a particularly simple operation and, at the same time, particularly advantageous securing against undesired rolling away can be realized.

A first aspect of the invention relates to a transmission for a motorcycle. Within the context of the invention, the motorcycle is a single-track motor vehicle which is also called a motorbike. The motorcycle can be used, for example, on its own, that is to say without a sidecar, or with a sidecar, with the result that the motorcycle and the sidecar then form a combination. The transmission comprises a housing which is also called a transmission housing, and at least one shaft which can be rotated relative to the housing, is received in the housing at least partially, in particular at least predominantly or completely, and which can be rotated, for example, about a rotational axis relative to the housing. The shaft is, for example, a transmission output shaft of the transmission. As an alternative or in addition, the shaft can be coupled at least indirectly to at least one wheel of the motorcycle, with the result that, for example in the completely manufactured state of the motorcycle, the at least one wheel can be driven via the transmission, in particular via the shaft, by at least one drive motor of the motorcycle, which drive motor is configured, for example, as an internal combustion engine.

Furthermore, the transmission comprises a locking device which has at least one locking element which is arranged in the housing. The locking element can be moved relative to the housing and, for example, relative to the shaft between at least one locked position and at least one released position. In the locked position, the locking element secures the shaft against a rotation relative to the housing about the rotational axis, with the result that, in the locked position, the shaft cannot rotate about the rotational axis relative to the housing. In the released position, however, the locking element releases the shaft for a rotation relative to the housing, in particular about the rotational axis, with the result that, in the released position, the shaft can rotate about the rotational axis relative to the housing. Since, for example in the completely manufactured state of the motorcycle, the at least one wheel is coupled to the shaft, it being possible, for example in the completely manufactured state of the motorcycle, for the wheel to be held at least indirectly on a frame of the motorcycle and to be capable of rotating about a wheel rotational axis relative to the frame, the wheel is secured, for example in the locked position of the locking element, against a rotation, in particular about the wheel rotational axis relative to the frame. This means that the wheel cannot rotate in the locked position of the locking element, since a rotation of this type of the wheel is prevented by means of the locking element via the shaft. Therefore, for example, the motorcycle cannot simply roll away and, in particular, cannot simply be rolled away in an undesired manner along a roadway, with the result that particularly advantageous protection of the motorcycle against undesired rolling away can be realized. In the released position, however, the wheel can rotate, in particular about the wheel rotational axis relative to the frame, since the shaft can rotate about its rotational axis relative to the housing.

In order for it then to be possible for a particularly advantageous operating capability of the motorcycle and particularly advantageous protection of the motorcycle against undesired rolling away to be realized, at least one operating element is provided according to the invention which is arranged at least partially outside the housing, that is to say in its surroundings, can be actuated manually by a person from outside the housing, that is to say from its surroundings, and can be moved relative to the housing as a result. By way of movement of the operating element relative to the housing, a movement of the locking element between the released position and the locked position can be brought about by means of the operating element. In other words, the locking element can be moved relative to the housing between the released position and the locked position by virtue of the fact that the operating element is moved manually relative to the housing from outside the housing. In this way, the locking element can be moved by the person from outside the housing in a simple and comfortable way via the operating element between the released position and the locked position.

Furthermore, a securing device is provided according to the invention which can be switched over between at least one secured state which secures the operating element against its movement relative to the housing and at least one unsecured state which releases the movement of the operating element relative to the housing. In other words, in the secured state, the operating element is secured by means of the securing device against a movement relative to the housing, with the result that the operating element and therefore the locking element cannot be moved relative to the housing. If, for example, the locking element is therefore situated in its locked position, and if the securing device is at the same time situated in its secured state, the locking element cannot be moved undesirably out of the locked position into the released position, with the result that particularly great protection against undesired rolling away and, as a consequence, for example particularly great anti-theft protection can be realized.

In the unsecured state, however, the securing device releases the movement of the operating element relative to the housing, with the result that, in the unsecured state of the securing device, the operating element can be moved relative to the housing. As a consequence, the locking element can be moved via the operating element relative to the housing, and can therefore be moved, for example, out of the locked position into the released position or conversely out of the released position into the locked position.

In order for it to be possible for the securing device to be switched over in a particularly simple and comfortable way between the secured state and the unsecured state and therefore for a particularly simple and comfortable operation of the transmission and therefore of the motorcycle overall to be realized, it is provided, furthermore, that the securing device has at least one receiving unit which is configured to receive at least one signal in a radio-based manner, that is to say without cables and therefore wirelessly, which signal is provided by a remote control in a radio-based manner, and to bring about a switchover of the securing device from the secured state into the unsecured state in a manner which is dependent on the receiving of the signal. The switchover of the securing device out of the secured state into the unsecured state is also called unsecuring of the securing device. The securing device can therefore be at least unsecured by means of the remote control and can preferably be secured, that is to say can be switched over out of the unsecured state into the secured state, with the result that, for example, the abovementioned person who desires to move the locking element out of the locked position into the released position and therefore to move the operating element can unsecure the securing device in a particularly simple and comfortable way.

It has been shown to be advantageous here in order for a particularly simple and comfortable operation of the motorcycle to be realized if the receiving unit is configured to detect that a spacing between a person and the operating element undershoots a predefinable threshold value, in particular that the person makes contact with the operating element. Furthermore, the receiving unit is configured to bring about the switchover of the securing device out of the secured state into the unsecured state in a manner which is dependent on the detection that the spacing between the person and the operating element undershoots the predefinable threshold value, in particular that the person makes contact with the operating element. As a result, for example, the person can unsecure the securing device in a particularly simple way, in such a way that the person, for example, simply carries the remote control with himself/herself, for example in a pocket of a clothing item, and that the person, for example, approaches the operating element with at least one body part, in particular makes contact with the operating element, in particular without the person actuating the remote control. The undershooting of the threshold value can be understood to mean, in particular, that the securing device, for example, is already unsecured or can be unsecured by virtue of the fact that the spacing between the operating element and the person undershoots the predefinable threshold value, without the person making contact with the operating element, however. Therefore, for example, the person can already unsecure the securing device by virtue of the fact that the person approaches the operating element, in particular with at least one body part, without making contact with the operating element, however. Furthermore, the undershooting of the threshold value can be understood to mean that the person unsecures or can unsecure the securing device by virtue of the fact that the person makes contact with or has to make contact with the operating element with at least one body part. The body part is, for example, a hand or a finger of a hand. Therefore, for example, if the spacing between the operating element and the finger undershoots the threshold value or the finger makes contact with the operating element, the securing device is unsecured when the receiving unit receives the signal which is provided by the remote control.

It can be seen overall that the receiving of the signal by way of the receiving unit and the detection that the spacing undershoots the threshold value or that the person makes contact with the operating element are two criteria which at least or exclusively have to be fulfilled, in order to bring about a switchover of the securing device out of the secured state into the unsecured state. In other words, if the two criteria are fulfilled, in particular at the same time or one after another within a predefinable time period, the securing device is unsecured or the receiving unit unsecures the securing device or brings about the unsecuring of the securing device.

Here, for example, the receiving unit comprises at least one receiving element and at least one evaluation element. By means of the receiving element, for example, the signal can be received. Furthermore, for example, it can be detected by means of the receiving element that the spacing undershoots the threshold value or that the person makes contact with the operating element. The receiving element provides, for example, at least one or more data which characterize the respective, abovementioned criteria, are electric, in particular, and are received by the evaluation element, for example. The evaluation element can evaluate the data and thus determine, for example, whether the criteria are fulfilled. If the evaluation unit determines that the two criteria are fulfilled, in particular at the same time or else within a predefinable time period, the receiving unit which acts, in particular, as a receiving and evaluation unit brings about the switchover of the securing device out of the secured position into the released position. In this way, the securing device can be unsecured without said remote control interacting mechanically with the motorcycle or being plugged into a corresponding recess of the motorcycle. In order to unsecure the securing device, it is merely sufficient that the receiving unit receives the signal which is provided by the remote control and that the person approaches the operating element with at least one body part such as his/her hand, in such a way that the spacing between the person and the operating element undershoots the threshold value, in particular that the person makes contact with the operating element. As a result, a particularly simple and comfortable operation of the motorcycle can be provided. After the unsecuring of the securing device, the operating element which is configured, for example, as a lever can be moved manually by the person, in order for it to be possible as a result for the locking element to be adjusted or moved as required.

The remote control is, for example, what is known as a key, by means of which, for example, the unsecuring and preferably the securing of the securing device can be brought about. Here, the key can have a key bit which can be plugged, for example, into a corresponding recess of the motorcycle, in order as a result, for example, to start the drive motor by way of mechanical interaction of the key with the motorcycle and/or to unsecure and/or to secure the motorcycle, in particular when, for example, the remote control is not capable of providing said signal or of unsecuring the motorcycle wirelessly, in particular in a radio-based manner. This can be the case, in particular, when no electric energy, with the aid of which the signal might be provided, is stored in an energy source of the remote control, which energy source is configured, for example, as a battery.

In order for it to be possible for a particularly simple operation or operating capability of the transmission and therefore the motorcycle overall to be realized, it is provided in a further refinement of the invention that the securing device is held on the housing at least indirectly, in particular directly, independently of the operating element.

Furthermore, it has been shown to be particularly advantageous if the securing device is held at least indirectly, in particular directly, on the operating element independently of the housing. A particularly advantageous operation or operating capability can also be realized as a result.

The securing device is, for example, a module which can be produced and therefore preassembled, for example, independently of the transmission, and can be mounted in the preassembled state on the transmission or on the lever. In order for it to be possible for desired functions such as the described unsecuring of the securing device to be realized, the module has a corresponding size, that is to say corresponding external dimensions. It has been found that, for example, the module cannot be arranged readily in a tank region or on a fork bridge of the motorcycle, since this might impair other functions and/or the visual appearance of the motorcycle. It has been shown to be particularly advantageous here if the module is held on the housing and therefore on the transmission or else on the operating element which is configured, for example, as a lever. As a result, an arrangement of the securing device or the module can be realized, which arrangement is particularly favorable in terms of installation space and is visually appealing.

A further embodiment is distinguished by the fact that the operating element can be pivoted about a pivot axis relative to the housing in order to bring about the movement of the locking element between the released position and the locked position. As a result, a particularly advantageous operation can be realized, since the locking element can be moved via the operating element with a merely low effort.

In a further refinement of the invention, the operating element is coupled permanently to the locking element, with the result that movements of the operating element relative to the housing at the same time accompany movements of the locking element between the locked position and the released position. In this way, the locking element can be moved simply and comfortably.

A further embodiment is distinguished by the fact that the locking element has at least one locking gear which is also called a ratchet wheel, is connected fixedly to the shaft so as to rotate with it, and can be pushed to and fro between the locked position and the released position in the axial direction of the shaft relative to the latter. In this way, particularly effective protection against undesired rolling away or rolling off can be realized in a way which is favorable in terms of installation space.

In order for it to be possible for the at least one wheel and therefore the motorcycle overall to be protected particularly effectively against undesired rolling away, it is provided in a further refinement of the invention that, in the locked position, the locking gear interacts at least indirectly, in particular directly, with the housing.

It has been shown to be particularly advantageous here if, in the locked position, the locking gear engages directly into the housing and, as a result, interacts directly in a positively locking manner with the housing. As a result, a particularly advantageous non-positive connection can be realized, with the result that the motorcycle can be protected against undesired rolling away, even counter to high forces or torques.

A second aspect of the invention relates to a motorcycle, with at least one drive motor which is configured, for example, as an internal combustion engine or else as an electric motor and by means of which at least one wheel of the motorcycle and therefore the motorcycle overall can be driven. Furthermore, the motorcycle comprises a transmission which can be driven by the drive motor, in particular a transmission according to the invention. The at least one wheel can be driven, for example, via the transmission by the drive motor. The transmission has a housing and at least one shaft which can be rotated relative to the housing and is received at least partially in the housing. Moreover, the motorcycle, in particular the transmission, comprises a locking device which has at least one locking element which is arranged in the housing. The locking element can be moved relative to the housing between at least one locked position, in which the locking element secures the shaft against rotation relative to the housing, and at least one released position, in which the locking element releases the shaft for a rotation relative to the housing.

In order for it then to be possible for a particularly advantageous operation or operating capability and particularly advantageous securing of the motorcycle against undesired rolling away to be realized, at least one operating element is provided according to the invention which is arranged at least partially outside the housing, can be actuated manually by a person from outside the housing, can be moved relative to the housing as a result, and by means of which, by way of movement of the operating element, a movement of the locking element between the released position and the locked position can be brought about. Moreover, a securing device is provided according to the invention which can be switched over between at least one secured state which secures the operating element against its movement relative to the housing and at least one unsecured state which releases the movement of the operating element relative to the housing.

Here, the securing device has at least one receiving unit which is configured to receive at least one signal in a radio-based manner and therefore without cables or wirelessly, which signal is provided by a remote control, and to bring about a switchover of the securing device out of the secured state into the unsecured state in a manner which is dependent on the receiving of the signal. Advantages and advantageous refinements of the first aspect of the invention are to be considered to be advantages and advantageous refinements of the second aspect of the invention, and vice versa.

As has previously been described with regard to the first aspect of the invention with respect to the operating element, it is preferably provided in the case of one advantageous embodiment of the second aspect of the invention that the receiving unit is configured to detect that a spacing between a person and at least one component of the motorcycle undershoots a predefinable threshold value, in particular that the person makes contact with the component. Furthermore, the receiving unit is preferably configured here to bring about a switchover of the securing device out of the secured state into the unsecured state in a manner which is dependent on the detection. The component is, for example, the above-described operating element or else a component of the motorcycle which is different than the operating element and is provided in addition to the operating element. If, for example, the receiving unit detects that the person approaches the component, in particular, with at least one body part such as a hand, in such a way that a spacing between the component and the person undershoots the threshold value, in particular that the person makes contact with the component, and if the receiving unit receives the signal which is provided by the remote control and is, in particular, electric and preferably electromagnetic, the receiving unit brings about the switchover of the securing device out of the secured state into the unsecured state. Therefore, the previous and following comments with respect to the operating element can also be transferred readily to the component and vice versa. Therefore, the person can unsecure the securing device in a particularly simple and comfortable way simply by virtue of the fact that the receiving unit receives the signal which is provided by the remote control and that the person approaches the component in such a way that a spacing between the person and the component undershoots the threshold value, in particular that the person makes contact with the component. Here, for example, the person simply carries the remote control with himself/herself, for example in a pocket of a clothing item. Therefore, the person can unsecure the securing device or bring about unsecuring of the securing device without the remote control interacting mechanically with the motorcycle or making contact with the motorcycle.

Undesired unsecuring operations of the securing device can be avoided by virtue of the fact that, in order to unsecure the securing device, not only the fulfillment of the criterion that the receiving unit receives the signal which is provided by the remote control is sufficient, but rather in addition at least the criterion that the spacing between the person and the component undershoots the threshold value also additionally has to be fulfilled. In other words, at least the abovementioned criteria have to be fulfilled, in order to unsecure the securing device. As a consequence, the person can move the operating element and as a result can move the locking element in a simple and comfortable way.

Further details of the invention result from the following description of one preferred exemplary embodiment with the associated drawings.

DETAILED DESCRIPTION OF THE DRAWINGS

In the figures, identical or functionally identical elements are provided with identical designations.

Figure 1:
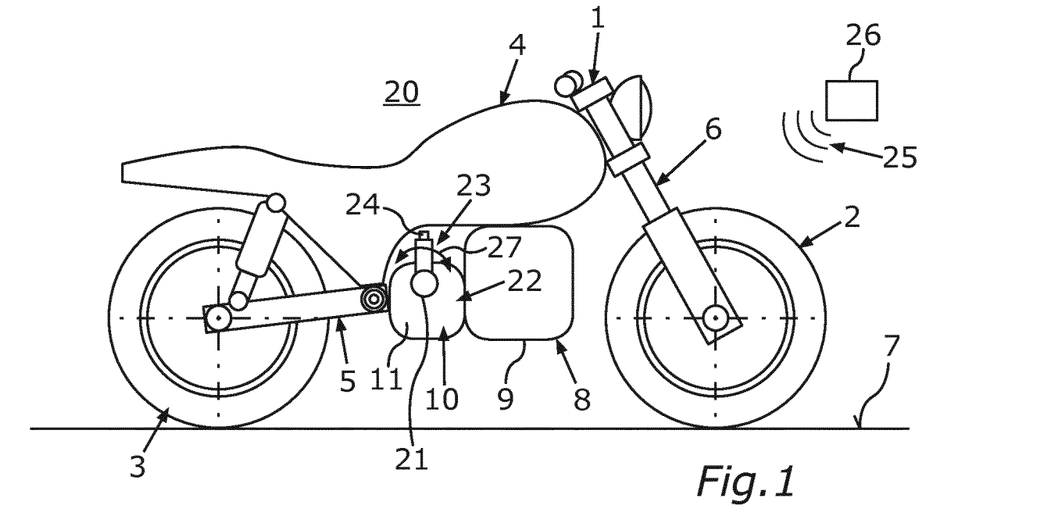
FIG. 1 shows a diagrammatic side view of a motorcycle according to an embodiment of the invention.

FIG. 1 shows a diagrammatic side view of a motorcycle 1 which is a single-track motor vehicle and is also called a motorbike. The motorcycle 1 comprises at least two or preferably precisely two wheels 2 and 3 which are arranged behind one another in the longitudinal direction of the motorcycle 1 and are assigned to the same track. Furthermore, the motorcycle 1 comprises a frame 4 which is shown particularly diagrammatically in FIG. 1 and on which the wheels 2 and 3 are held in each case such that they can be rotated at least indirectly. Here, furthermore, the motorcycle 1 comprises a swing arm 5 which is held pivotably on the frame 4 and is supported in a sprung and damped manner on the frame 4. Here, the wheel 3 is held rotatably on the swing arm 5 and, via the latter, on the frame 4. Furthermore, the motorcycle 1 comprises a fork 6 which is configured, for example, as a damper fork, can be held pivotably on the frame 4, and therefore can be pivoted relative to the frame 4 about a pivot axis which is also called a steering axis. Here, the wheel 2 is held rotatably on the fork 6. If the fork 6 is pivoted about the steering axis relative to the frame 4, the wheel 2 and therefore the motorcycle 1 overall are steered, as a result of which, for example, directional changes or driving around bends of the motorcycle 1 can be brought about.

It can be seen from FIG. 1 that the wheel 2 is a front wheel, whereas the wheel 3 is a rear wheel of the motorcycle 1. The motorcycle 1 can be supported in the vertical direction via the wheels 2 and 3 on a roadway 7, and can be ridden here along the roadway via the wheels 2 and 3. In the case of riding along the roadway, the wheels 2 and 3 roll on the roadway 7.

Figure 2:
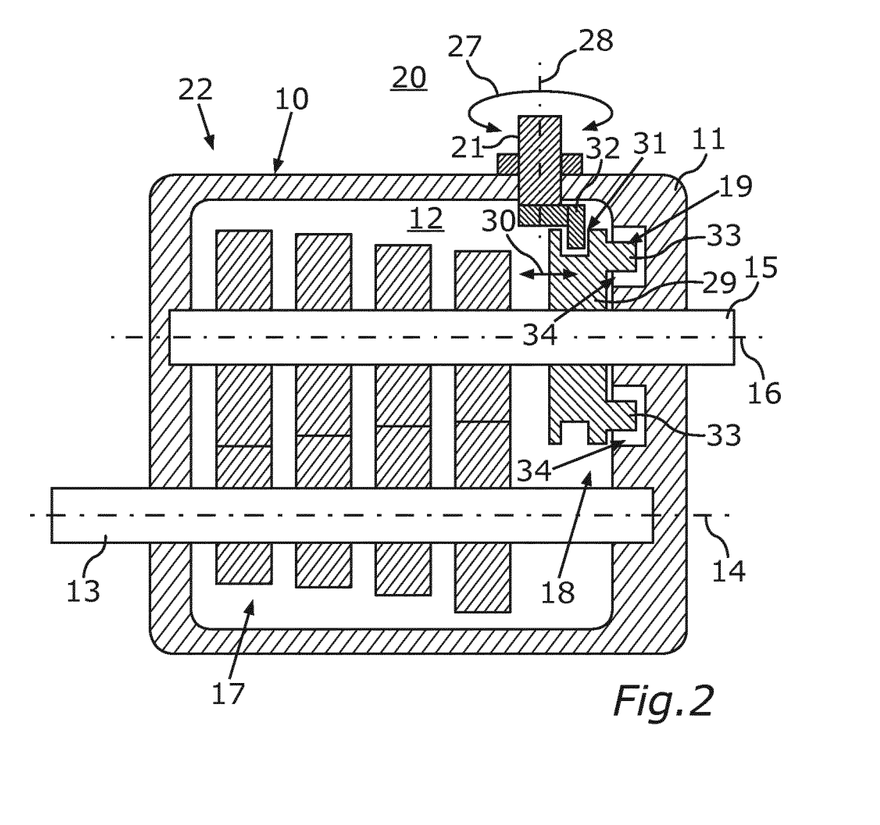
FIG. 2 shows a diagrammatic and sectioned side view of a transmission according to an embodiment of the invention of the motorcycle.

The motorcycle 1 comprises a drive train 8 which is held at least indirectly on the frame 4 or is connected to the frame 4 and by means of which, for example, the wheel 3 and therefore the motorcycle 1 overall can be driven. The drive train 8 comprises, for example, a drive motor 9 which is configured, in particular, as an internal combustion engine, and a transmission 10, via which the wheel 3 and therefore the motorcycle 1 overall can be driven by the drive motor 9. The transmission 10 is shown in FIG. 2 in a diagrammatic and sectioned side view. It can be seen from FIG. 2 that the transmission 10 has a housing 11 which is also called a transmission housing and by way of which, for example, a receiving space 12 is delimited or formed at least partially, in particular at least predominantly or completely. The housing 11 comprises, for example, at least two housing elements which are configured separately from one another and are connected to one another.

Furthermore, the transmission 10 comprises a first shaft which is configured as a transmission input shaft 13, is mounted rotatably on the housing 11, and, as a result, can be rotated about a first rotational axis 14 relative to the housing 11. The transmission input shaft 13 can be driven, for example, by the drive motor 9, in particular by an output shaft of the drive motor 9 which is configured as a crankshaft, with the result that, for example, torques which are provided by the drive motor 9 via the output shaft can be transmitted from the output shaft to the transmission input shaft 13. The torques which are provided by the drive motor 9 via the output shaft can be introduced via the transmission input shaft 13 into the transmission 10, with the result that the transmission 10 can be driven or is driven by the drive motor 9 via its output shaft.

Furthermore, the transmission 10 comprises a second shaft in the form of a transmission output shaft 15 which is mounted rotatably on the housing 11. As a result, the transmission output shaft 15 can be rotated fundamentally about a second rotational axis 16 relative to the housing 11. Here, the rotational axes 14 and 16 run, for example, at least substantially parallel to one another and are spaced apart from one another, that is to say are offset with respect to one another. The transmission output shaft 15 is coupled, for example, at least indirectly to the wheel 3, the transmission output shaft 15 being coupled, in particular, permanently to the wheel 3. Therefore, if the transmission output shaft 15 is rotated about the rotational axis 16 relative to the housing 11, the wheel 3 is rotated relative to the frame 4 as a result. Conversely, if, for example, the wheel 3 is rotated relative to the frame 4, in particular, by virtue of the fact that the motorcycle 1 is rolled along the roadway 7 in the state, in which it is supported via the wheels 2 and 3 on the roadway 7, the transmission output shaft 15 is rotated about the rotational axis 16 relative to the housing 11 as a result, which is possible, in particular, when the transmission output shaft 15 is released for a rotation relative to the housing 11 about the rotational axis 16.

The shafts can be coupled or are coupled to one another, in particular in a torque-transmitting manner, for example via respective gearwheels 17 which are arranged on the respective shafts. In other words, torques can be transmitted between the shafts via the gearwheels 17 of the transmission 10 which, for example, mesh with one another, with the result that, for example, the wheel 3 can be driven by the output shaft of the drive motor 9 and therefore by the drive motor 9 via the transmission output shaft 15, the respective gearwheels 17 and the transmission input shaft 13.

It can be seen particularly clearly from FIG. 2 that the transmission 10 has a locking device 18 which comprises at least one locking element 19 which is arranged in the housing. The locking element 19 can be moved, in particular in a translational manner, relative to the housing 11 and relative to the shafts between at least one locked position which is shown in FIG. 2 and at least one released position which is not shown in the figures. In the locked position, the transmission output shaft 15 is secured by means of the locking element 19 against a rotation relative to the housing 11 about the rotational axis 16, with the result that the transmission output shaft 15 cannot then rotate about the rotational axis 16 relative to the housing 11. The wheel 3 also cannot then rotate relative to the frame 4. As a result, for example, the motorcycle 1 is secured against undesired rolling away or rolling along the roadway 7. In the released position, however, the locking element 19 releases the transmission output shaft 15 for a rotation about the rotational axis 16 relative to the housing 11, with the result that the transmission output shaft 15 can then rotate about the rotational axis 16 relative to the housing 11 and the wheel 3 can rotate relative to the frame 4.

In order for it then to be possible for a particularly advantageous operation or operating capability and particularly advantageous protection of the motorcycle 1 against undesired rolling away to be realized, the motorcycle 1, in particular the transmission 10, comprises at least one operating element in the form of a lever 21, which operating element is arranged at least partially outside the housing 11 and therefore in its surroundings 20, can be actuated manually by a person from outside the transmission 10 and therefore from the surroundings 20, and can be moved relative to the housing 11 as a result. The lever 21 is arranged, for example, at or on a side 22 of the housing 11, the side 22 pointing toward the outside in the transverse direction of the motorcycle 1. Therefore, the lever 21 can be actuated simply and comfortably by said person from the side 22 and, as a result, can be moved relative to the housing 11. By means of the lever 21, a movement of the locking element 19 between the released position and the locked position can be brought about by way of movement of the lever 21 relative to the housing 11.

Moreover, the motorcycle 1, in particular the transmission 10, comprises a securing device 23 which is shown particularly diagrammatically in FIG. 1, is configured, in particular, as a module or module part, and can be switched over between at least one secured state which secures the lever 21 against its movement relative to the housing 11 and at least one unsecured state which releases the movement of the lever 21 relative to the housing 11. As can be seen here from FIG. 1, the securing device 23 comprises a receiving unit 24 which is shown particularly diagrammatically in FIG. 1, acts as a receiving and evaluation unit, and is configured to receive at least one signal 25 in a radio-based manner and therefore without cables or lines or wirelessly, which signal 25 is, in particular, electric, preferably electromagnetic, and is provided in a radio-based manner and therefore without cables or lines by a remote control 26 which is shown particularly diagrammatically in FIG. 1, said receiving unit 24 also being configured to bring about a switchover of the securing device 23 out of the secured state into the unsecured state in a manner which is dependent on the receiving of the signal 25.

Furthermore, the receiving unit 24 is configured to detect that a spacing between said person and a component such as the lever 21 of the motorcycle 1 undershoots a predefinable threshold value, in particular that the person makes contact with the lever 21. Moreover, the receiving unit 24 is configured to bring about the switchover of the securing device 23 out of the secured state into the unsecured state in a manner which is dependent on the detection that the spacing between the person and the lever 21 undershoots the predefinable threshold value. This means that the securing device 23 can be unsecured or is unsecured when and only when the receiving unit 24 receives the signal 25 and detects that the spacing between the person and the lever 21 undershoots the predefinable threshold value, in particular that the person makes contact with the lever 21. The lever 21 is a component of the motorcycle 1, it being possible, for example, for the previous and following comments with respect to the lever 21 with regard to the detection that the spacing between the person and the lever 21 undershoots the predefinable threshold value to also be transferred readily to at least one other component of the motorcycle 1, which component is different than the lever 21 and is provided in addition to the latter.

It can be seen overall that the person can unsecure the securing device 23 in a particularly simple and comfortable way by virtue of the fact that the person, for example, carries the remote control 26 with himself/herself, with the result that the receiving unit 24 can receive the signal 25, and that the person approaches the component (in the present case, in the form of the lever 21) in such a way that the person makes contact with the component or that the spacing between the person and the component undershoots the threshold value. Here, the remote control 26 provides the signal 25 permanently and/or independently of an actuation/operation of the remote control 26 brought about by way of the person. In this way, the person can switch over the securing device 23 from the secured state into the unsecured state and can therefore unsecure it, without the remote control 26 making contact with the motorcycle 1 or interacting mechanically with the motorcycle 1, and without the person actuating the remote control 26.

Here, the securing device 23 is held on the housing 11 at least indirectly, in particular directly, independently of the lever 21, or the securing device 23 is held on the operating element in the form of the lever 21 at least indirectly, in particular directly, independently of the housing 11. As a result, the securing device 23 can be installed in a manner which is particularly favorable in terms of installation space and visually appealing, with the result that, in particular, a particularly advantageous visual appearance of the motorcycle 1 overall can be realized.

It can be seen from FIGS. 1 and 2 and is illustrated by way of a double arrow 27 that the lever 21 can be pivoted about a pivot axis 28 relative to the housing 11 in order to bring about the movement of the locking element 19 between the released position and the locked position. Furthermore, the lever 21 is coupled permanently to the locking element 19, with the result that movements of the lever 21 relative to the housing 11 at the same time accompany movements of the locking element 19 between the locked position and the released position. Here, the locking element 19 has at least one locking gear 29 which is connected fixedly to the transmission output shaft 15 so as to rotate with it, can be pushed to and fro relative to the transmission output shaft 15 (as illustrated in FIG. 2 by way of a double arrow 30) in the axial direction of the transmission output shaft 15 and therefore along the rotational axis 16, and can be moved between the locked position and the released position as a result.

Here, the locking gear 29 has a recess 31, into which the lever 21 engages, in particular via a finger 32 of the lever 21. As a result, the lever 21 is permanently connected in a positively locking manner to the locking gear 29, with the result that the locking gear 29 can be pushed to and fro between the locked position and the released position relative to the transmission output shaft 15 in the axial direction of the latter by virtue of the fact that the lever 21 is pivoted about the pivot axis 28 relative to the housing 11, in particular is pivoted to and fro.

Moreover, it can be seen particularly clearly from FIG. 2 that, in the locked position, the locking gear 29 interacts directly with the housing 11 in a positively locking manner, by the locking gear 29, in particular respective fingers 33 of the locking gear 29, engaging into respective corresponding recesses 34 of the housing 11. The recesses 34 can be formed by way of an element which is fastened in the housing 11, that is to say, for example, by way of an element which is configured separately from the housing 11 and is fastened on the latter. As a result, the locking gear 29 is secured against a rotation relative to the housing 11 about the rotational axis 16. Since the locking gear 29 is connected fixedly to the transmission output shaft 15 so as to rotate with it, the transmission output shaft 15 is also secured against a rotation relative to the housing 11 about the rotational axis 16.

The fingers 33 are also called claws which, in the locked position, engage into the corresponding recesses 34 which are also called pockets. Here, the respective pocket preferably has at least one deflector bevel, with the result that the claws can be moved into the pockets and the transmission output shaft 15 can be fixed on the housing 11 so as to rotate with it only when the transmission output shaft 15 is rotating at a merely very low rotational speed about the rotational axis 16 relative to the housing 11 or when the transmission output shaft 15 is at a standstill. The respective deflector bevel is formed, for example, by way of at least one wall region, in particular of the housing 11, the wall region at least partially delimiting the respective pocket, in particular in the circumferential direction of the transmission output shaft 15 or the locking gear 29. Here, the circumferential direction of the transmission output shaft 15 or of the locking gear 29 runs about the rotational axis 16 and is therefore situated in a plane, with respect to which the rotational axis 16 runs perpendicularly. Here, for example, the wall region runs obliquely with respect to the rotational axis 16 or in a plane which runs obliquely with respect to the rotational axis 16. Here, in particular, the wall region runs obliquely with respect to the rotational axis 16 in such a way that the wall region or the pocket which is delimited at least partially by way of the wall region widens in the axial direction of the transmission output shaft 15 toward the locking gear 29 or in the direction of the released position.

Therefore, if, for example, the locking gear 29 is first of all situated in the released position, while the transmission output shaft 15 is rotating about the rotational axis 16 relative to the housing 11 at a rotational speed which is too high for the movement of the locking gear 29 out of the released position into the locked position, and if an attempt is then made, for example, via the lever 21 to move the locking gear 29 out of the released position into the locked position, with the result that the locking gear 29 is moved a little out of the released position in the direction of the respective pocket and therefore in the direction of the locked position, the locking gear 29 is moved, in particular is pressed, here again back in the direction of the released position or into the released position by means of the respective deflector bevel, since, for example as a consequence of an interaction of the locking gear 29, in particular the respective claw, with the deflector bevel, a force is configured of the type which is directed in the direction of the released position, acts on the locking gear 29, and therefore moves, in particular presses, the locking gear into the released position. Excessive loads can be avoided as a result.

It can be seen overall that particularly robust and simply operable protection against undesired rolling away can be realized by means of the transmission 10, with the result that the motorcycle 1 overall can be protected particularly advantageously against undesired rolling away and at the same time can be operated simply here.

LIST OF DESIGNATIONS

1 Motorcycle
2 Wheel
3 Wheel
4 Frame
5 Swing arm
6 Fork
7 Roadway
8 Drive train
9 Drive motor
10 Transmission
11 Housing
12 Receiving space
13 Transmission input shaft
14 Rotational axis
15 Transmission output shaft
16 Rotational axis
17 Gearwheels
18 Locking device
19 Locking element
20 Surroundings
21 Lever
22 Side
23 Securing device
24 Receiving unit
25 Signals
26 Remote control
27 Double arrow
28 Pivot axis 29 Locking gear
30 Double arrow
31 Recess
32 Arm
33 Arm
34 Recess

What is claimed is:

1. A transmission for a motorcycle, comprising:
a housing;
at least one shaft arranged at least partially in the housing and being rotatable relative to the housing;
a locking device having at least one locking element, the locking device being arranged in the housing and being rotatable relative to the housing between
  at least one locked position in which the locking element secures the shaft against a rotation relative to the housing, and
  at least one released position in which the shaft is released for rotation relative to the housing;
at least one operating element arranged at least partially outside the housing, the at least one operating element being configured to be actuated manually to move relative to the housing such that a movement of the locking element between the released position and the locked position is enabled; and
a securing device configured to be switched over between
  at least one secured state in which the at least one operating element is secured against movement relative to the housing, and at least one unsecured state in which the at least one operating element is movable,
wherein
  the securing device includes at least one receiving unit configured to receive at least one signal in a radio-based manner from a remote control,
  the at least one receiving unit is configured to, in response to actuation of the remote control, to switchover the securing device from the secured state into the unsecured state, and
  the locking element has at least one locking gear connected fixedly to the shaft such that the at least one locking gear rotates with the shaft in an axially displaceable manner between the locked position and the released position.

2. The transmission according to claim 1, wherein the at least one receiving unit is configured
  to detect whether a spacing between the remote control and the at least one operating element undershoots a predefined threshold value, and
  to switchover the securing device out of the secured state into the unsecured state if the spacing of the remote control is determined to undershoot the predefined threshold value.

3. The transmission according to claim 2, wherein the securing device is arranged indirectly or directly on the housing, independent of the at least one operating element.

4. The transmission according to claim 2, wherein the securing device is arranged indirectly or directly on the at least one operating element, independent of the housing.

5. The transmission according to claim 1, wherein the at least one operating element is pivotable about a pivot axis relative to the housing such that the locking element moves between the released position and the locked position.

6. The transmission according to claim 5, wherein the at least one operating element is fixedly coupled to the locking element such that movements of the at least one operating element relative to the housing occur with movements of the locking element between the locked position and the released position.

7. The transmission device according to claim 1, wherein in the locked position, the locking gear interacts at least indirectly with the housing in a positive locking manner.

8. The transmission according to claim 7, wherein in the locked position, the locking gear interacts directly in a positively locking manner with the housing, with an element which is configured separately from the housing, or with both the housing and the element configured separately from the housing.

9. A motorcycle, comprising:
at least one drive motor; and
a transmission configured to be driven by the drive motor, wherein the transmission includes
  a housing;
  at least one shaft arranged at least partially in the housing and being rotatable relative to the housing;
  a locking device having at least one locking element, the locking device being arranged in the housing and being rotatable relative to the housing between
    at least one locked position in which the locking element secures the shaft against a rotation relative to the housing, and
    at least one released position in which the shaft is released for rotation relative to the housing;
  at least one operating element arranged at least partially outside the housing, the at least one operating element being configured to be actuated manually to move relative to the housing such that a movement of the locking element between the released position and the locked position is enabled; and
  a securing device configured to be switched over between at least one secured state in which the at least one operating element is secured against movement relative to the housing, and at least one unsecured state in which the at least one operating element is movable,
wherein
  the securing device includes at least one receiving unit configured to receive at least one signal in a radio-based manner from a remote control,
  the at least one receiving unit is configured to, in response to actuation of the remote control, to switchover the securing device from the secured state into the unsecured state, and
the locking element has at least one locking gear connected fixedly to the shaft such that the at least one locking gear rotates with the shaft in an axially displaceable manner between the locked position and the released position.

10. A transmission for a motorcycle, comprising:
a housing;
at least one shaft arranged at least partially in the housing and being rotatable relative to the housing;
a locking device having at least one locking element, the locking device being arranged in the housing and being rotatable relative to the housing between
  at least one locked position in which the locking element secures the shaft against a rotation relative to the housing, and
  at least one released position in which the shaft is released for rotation relative to the housing;

at least one operating element arranged at least partially outside the housing, the at least one operating element being configured to be actuated manually to move relative to the housing such that a movement of the locking element between the released position and the locked position is enabled; and a securing device configured to be switched over between at least one secured state in which the at least one operating element is secured against movement relative to the housing, and at least one unsecured state in which the at least one operating element is movable, wherein
- the securing device includes at least one receiving unit configured to receive at least one signal in a radio-based manner from a remote control,
- the at least one receiving unit is configured to, in response to actuation of the remote control, to switchover the securing device from the secured state into the unsecured state, and
- the at least one receiving unit is configured
  - to detect whether a spacing between the remote control and the at least one operating element undershoots a predefined threshold value, and
  - to switchover the securing device out of the secured state into the unsecured state if the spacing of the remote control is determined to undershoot the predefined threshold value.

* * * * *